United States Patent [19]

Grant et al.

[11] Patent Number: 4,732,938

[45] Date of Patent: Mar. 22, 1988

[54] THERMOPLASTIC POLYAMIDE—POLYPHENYLENE ETHER COMPOSITIONS

[75] Inventors: Thomas S. Grant, Vienna; Ronald L. Jalbert, Woodland Park; David Whalen, Parkersburg, all of W. Va.

[73] Assignee: Borg-Warner Chemicals, Inc., Parkersburg, W. Va.

[21] Appl. No.: 805,644

[22] Filed: Dec. 6, 1985

[51] Int. Cl.⁴ .................. C08L 71/04; C08G 65/48
[52] U.S. Cl. .................................. 525/92; 525/391; 525/397
[58] Field of Search ................ 525/391, 397, 92

[56] References Cited

U.S. PATENT DOCUMENTS

| | | | |
|---|---|---|---|
| 3,379,792 | 4/1968 | Finholt | 260/857 |
| 4,315,086 | 2/1982 | Ueno et al. | 525/391 |
| 4,338,421 | 7/1982 | Maruyama et al. | 525/397 |
| 4,339,376 | 7/1982 | Kasahara et al. | 524/116 |

FOREIGN PATENT DOCUMENTS

| | | |
|---|---|---|
| 5927942 | 8/1982 | Japan . |
| 5959724 | 9/1982 | Japan . |
| 5966452 | 10/1982 | Japan . |
| 5986653 | 11/1982 | Japan . |
| 58-117250 | 7/1983 | Japan . |
| 85/05372 | 12/1985 | PCT Int'l Appl. . |

*Primary Examiner*—John C. Bleutge
*Assistant Examiner*—A. Carrillo
*Attorney, Agent, or Firm*—Emily A. Richeson; Richard J. Schlott

[57] ABSTRACT

Compositions comprising a carboxylated PPE resin and a polyamide having good compatibility and impact properties. The carboxylated PPE resin/polyamide alloys are produced by a process wherein a mixture consisting essentially of the PPE resin and a minor amount of an unsaturated carboxylic compound are first melt processed, then compounded with the polyamide.

8 Claims, No Drawings

THERMOPLASTIC POLYAMIDE—POLYPHENYLENE ETHER COMPOSITIONS

BACKGROUND OF THE INVENTION

This invention relates to highly heat-resistant polyamide compositions and more particularly to compositions comprising polyamides and phenylene ether resins and to an improved method for the preparation of polyamide - phenylene ether resin compositions.

Polyamides, commonly termed nylon resins, are well known for possessing an outstanding combination of strength, toughness and resistance to solvents. Unmodified nylons are widely used in applications requiring those characteristics where low or moderate loads will be encountered and particularly where exposure to extreme temperatures is not likely. Toughened versions of nylons have found increasing use in automotive applications such as trim parts, and reinforcement of polyamides with glass and glass/mineral combinations has extended their acceptance for such diverse applications as fan blades, valve covers, bicycle wheels and the like. However, for applications that require retention of mechanical properties for long periods of use at elevated temperatures, these compositions are also generally considered to be unsatisfactory. Additionally, even though glass and mineral fillers serve to increase rigidity and reduce the shrinkage tendencies of nylon resins, it is well known that filled compositions exhibit reduced ductility and toughness. Filled compositions also may have poor melt flow characteristics which in turn increases the difficulty of molding such compositions.

One method for improving the properties of thermoplastic polyamide compositions without reducing good flow and processing characteristics has been to blend polyamides with dissimilar resins. However, aliphatic and aromatic polyamides are highly polar materials. They are generally incompatible or at best only poorly compatible with a great many dissimilar resins, and particularly so with much less polar resins such as polyolefins, styrenic resins, phenylene ether resins and the like. Blends of polyamides with such resins often exhibit phase segregation in the melt and poor interphase adhesion, which results in delamination, lower ductility and generally poor mechanical properties in extruded or injection molded parts. A method widely known in the art for overcoming such problems has been to provide more polar radicals or amine-reactive groups in the polymer chains of the less polar resin. Carboxylated polyolefins are known to form improved alloys with polyamides, as shown for example in U.S. Pat. No. 4,362,846, and syrenic resins containing a small amount of copolymerized functional monomer such as acrylic acid, maleic anhydride or an epoxy compound become grafted with polyamide when the two resins are melt-processed together, as is disclosed in U.S. Pat. Nos. 3,668,274 and 4,221,879. Processes for introducing reactive functionality such as carboxyl groups into phenylene ether resins are also well known. These modified resins are said to be useful for preparing polyphenylene ethers having chemically linked polyamide chains, as is disclosed in U.S. Pat. No. 3,259,520. Treating preformed polyphenylene ethers with a combination of a styrenic monomer and maleic anhydride in presence of a free-radical initiator is shown in U.S. Pat. No. 4,097,556 to provide polyphenylene ether-styrene-maleic anhydride graft copolymers which are said to be useful in blends with polyamides. Processes for directly attaching maleic anhydride to phenylene ether resins in the presence of a peroxide are shown in published Japanese applications Nos. 59/66452 and 59/59724. Blends of these maleated phenylene ether resins with polyamides are also disclosed therein.

Processes are thus now available for producing alloys of nylons with a variety of dissimilar resins, resulting materials having improved impact, reduced shrinkage and better oven warpage characteristics. Of particular interest for extended use under very severe high temperature conditions are blends of nylons with very high temperature resins such as polyphenylene ethers. These compositions exhibit good solvent resistance and, depending upon the ratio of the components, may possess useful high temperature resistance and good physical properties.

Although the methods available for preparing alloys of phenylene ether resins and polyamides appear to be successful, further improvements are needed. Chemical modification of phenylene ether resins, either by use of functional comonomers or in a post-reaction, requires additional and costly process steps. The methods presently known for directly modifying phenylene ether resins generally require extended mixing times at melt processing temperatures and/or the use of free-radical compounds, conditions which tend to promote cross-linking and/or deterioration of the resin. Extended mixing at high temperatures also increases energy consumption and adds to production costs. An improved method for preparing such alloys which substantially reduces processing times and minimizes resin cross-linking and degradation is needed.

SUMMARY OF THE INVENTION

The process of this invention is an improved method for making compositions comprising polyamides and phenylene ether resins, the process comprising the steps of first carboxylating the phenylene ether resin by melt-processing a mixture of a phenylene ether resin and an ethylenically-unsaturated carboxylic acid compound, then melt blending the carboxylated phenylene ether resin product with a polyamide.

DETAILED DESCRIPTION

The phenylene ether resins (or PPE resins) useful for the purposes of this invention include both the homopolymers prepared by the oxidative coupling of a 2,6-dialkylphenol as disclosed for example in U.S. Pat. No. 3,306,874, as well as the copolymers of 2,6-dialkylphenols and 2,3,6-trialkylphenols described in U.S. Pat. No. 4,011,200. In general, these resins are prepared by oxidative coupling of a 2,6-dialkylphenol such as 2,6-dimethylphenol or a mixture of a 2,6-dialkylphenol and a 2,3,6-trialkylphenol such as 2,3,6-trimethylphenol. In forming copolymers suitable for the practice of this invention, the proportion of 2,3,6-trialkylphenol will lie in the range of from about 2 to about 50 wt % based on total polyphenylene ether. However, the preferred copolymers will comprise from about 2 to 20 wt %, more preferably from about 2 to 10 wt % 2,3,6-trialkylphenol, and, correspondingly from about 98 to about 80, more preferably from about 98 to about 90 wt % 2,6-dialkylphenol. The synthesis of these homopolymers and copolymers by a variety of oxidative coupling processes is well known in the art, and such polymers have become available to the art from commercial sources.

Carboxylation of the phenylene ether resin is carried out by melt-blending a mixture of the phenylene ether resin with an ethylenically-unsaturated compound containing a carboxylic group, e.g. a carboxylic acid, ester, amide or anhydride group, such as for example maleic anhydride, itaconic anhydride, glutonic anhydride, citraconic anhydride, tetrahydrophthalic anhydride or the like, as well as the carboxylic acid, ester, amide and imide analogs thereof, i.e. maleic acid, itaconic acid, fumaric acid, dimethylmaleate, maleimide, tetrahydrophthalimide and the like. The carboxylic compounds useful for the purposes of this invention may be more broadly characterized as having both a reactive ethylenic carbon-carbon double bond and a reactive carboxylic functional group.

The phenylene ether resin and the carboxylic compound will be combined and melt-processed in conventional melt compounding equipment such as a compounding extruder or the like. Although it is at least conceptually possible to melt-mix the phenylene ether resin and then add the carboxylic compound thereto, the most practical and convenient processing method will be to dry blend the components thoroughly as powders and/or pellets to obtain a well-mixed and complete dispersion of the components and then meltmixing the dry blend. The application of high shearing forces together with external heating achieves a further thorough mixing of the components and melting of the resinous component and provides the conditions necessary to achieve the interaction of the carboxylic compound with the resin.

In carrying out the carboxylation step of the process of this invention, prolonged mixing times are to be avoided. Phenylene ether resins are high melt temperature materials and are difficult to melt mix thoroughly; high stock temperatures, normally in the range of from 600°-750° F. are commonly used in PPE compounding operations. High shear mixing devices such as for example single or twin screw compounding extruders, are therefore generally preferred for successful melt-processing. Such devices, and particularly twin-screw compounding extruders, can rapidly melt process PPE resins with high shear and thorough mixing, permitting shortened residence times and thus reducing the extent of exposure to severe heat conditions; ie., the heat history of the resin is minimized. The use of heated roll mills, Banbury mixers and the like for compounding these resins may require extended mixing times, which increases the heat history of the resin and may cross link, gel and/or oxidize the phenylene ether resin; hence although these devices may be employed for the purposes of this invention when care is used to avoid such detrimental results, these devices are not preferred.

The carboxylated phenylene ether resin produced in this process step may be used directly for preparing alloys with polyamides. However, the interaction of the carboxylic compound with the PPE resin may be incomplete, and the carboxylated polyphenylene ether may thus contain a substantial portion of unattached carboxylic compound, either as unreacted carboxylic compound or as a low-molecular weight reaction by-product. Low molecular weight carboxylic compounds such as maleic anhydride may interact deleteriously with polyamides under melt blending conditions and, depending on the chemical nature of the carboxylic compound, may cross link the polyamide and/or alter the molecular weight of the polyamide by chain scission or graft-linking reactions.

It may therefore be desirable to remove any remaining low molecular weight carboxylic compounds. In as much as the unattached low molecular weight compounds are volatile at the temperatures required for melt processing, these compounds may be readily removed by devolatilizing the melt during or after the carboxylation step preferably by means of a vented or vacuum-vented extruder. Alternatively the unattached carboxylic compounds, if present, may be removed from the carboxylated phenylene ether resin in a separate process step, such as by extraction with a suitable solvent, or by dissolving the resin in a suitable solvent and then re-precipitating the resin.

The amount of carboxylic compound employed will thus depend in part upon the particular carboxylic compound selected and upon the melt processing conditions and equipment used in the carboxylation step. In general, the level of carboxylic compound attached to the phenylene ether resin will desirably lie in the range of from about 0.05 to 2 wt. %, preferably 0.05 to about 1.0 wt. % and still more preferably, from 0.1 to about 0.5 wt. %, based on phenylene ether resin. At levels below this range, little if any effect will be seen, while at levels much above 0.75 wt. % and particularly above 1.0 wt. %, a substantial reduction occurs in the physical properties of resulting alloys, and some deterioration of the PPE resin may be seen. Where the melt processing conditions employed are highly effective in promoting the carboxylation, the level of carboxylic compound charged will approximate that desired in the carboxylated PPE. Where less efficient carboxylation processing conditions are used, and partcularly where a devolatilization or other process step will be employed, thus removing any unattached low molecular weight carboxylic compound that results, higher levels of carboxylic compound may be charged. It may also be a desirable alternative method for some purposes to effect an even higher level of PPE carboxylation, then melt-blend the resulting carboxylated resin with sufficient un-carboxylated PPE resin to provide resin with the desired degree of carboxylation for further blending in the preparation of alloys with polyamide.

In preparing alloys of polyphenylene ether and polyamide according to the process of this invention, the carboxylated phenylene ether resin is further compounded with a polyamide resin. Generally, the blend will comprise from 5 to 95 parts by weight of polyamide resin and correspondingly from 95 to 5 parts by weight of carboxylated phenylene ether resin. At low levels of polyamide, particularly below about 25 pbw, the compositions may be difficult to process and may become cross-linked and intractable, hence such compositions are not preferred.

The polyamides useful for the purposes of this invention are the conventional injection-moldable polyamide resins known widely as nylon resins, including both aliphatic polylactams such as polycaprolactam (Nylon 6) and higher analogs such as Nylon 11 and Nylon 12, and polyamides formed from aliphatic diamines and aliphatic dicarboxylic acids such as polyhexamethylene sebacamide (Nylon 6,10) polyhexamethylene adipamide (Nylon 6,6) and the like. Further examples of useful polyamides include the amorphous as well as the crystalline versions, the toughened polyamides, and the aromatic-aliphatic copolymers, terpolymers and tetrapolymers. A great variety of these nylon resins are well-known and widely available commercially.

Combining the carboxylated phenylene ether resin with the polyamide may be accomplished by any of the common melt blending processes, including the use of compounding extruders, Banbury mixers, roll mills and the like. The powdered or pelletized resins may be dry blended, then fed to the processing equipment, or, alternatively, one of the resinous components may be fluxed in the melt processing equipment, then combined by adding the remaining resinous component, together with impact modifiers, additional pigments, dyes, fillers, stabilizers, antioxidants, lubricants, plasticizers and the like as may be desired, and according to the practices commonly employed in the thermoplastic compounding art.

The resulting alloy is a readily melt-processable thermoplastic exhibiting no significant delamination. These compositions are thus not highly-crosslinked, and yet do not exhibit any of the characteristics of the incompatible mixtures attained by a simple mixing and molding of phenylene ether resins and nylons. Whether this composition is an alloy of now highly compatible components or is a graft resin comprising a graft of nylon and polyphenylene components is not known. Hence the product composition can best be described in terms of the method of its preparation.

The compositions of this invention are useful thermoplastics, and may be further modified by the addition of fillers, reinforcing fibers, dyes, pigments, flame retardants, antioxidants, stabilizers, plasticizers, processing aids and the like, as is well-known and practiced in the molding art. Particularly useful are compositions further modified by the addition of suitable impact modifiers, and particularly those well-known and commonly used for the impact modification of polyphenylene ether resins, such as impact modified styrenic resins, block copolymer elastomer resins, olefin polymers and the like. The compositions of this invention may also be extended by further compounding with suitable resins, such as styrenic resins, as well as by the further addition of polyamides, polyphenylene ethers and the like. The compositions of this invention may further be useful as modifiers, and particularly as aids for use in preparing further blends of phenylene ether resins and polyamides.

The invention will be better understood by consideration of the following examples, which are obtained by way of illustration of the invention and not in limitation thereof.

In the examples, the following abbreviations and terms are employed:
PEC=copolymer of 2,6-dimethylphenol (95%) and 2,3,6-trimethylphenol (5%), prepared substantially by the process of U.S. Pat. No. 4,011,200
H-PPE=homopolymer of 2,6-dimethylphenol, prepared substantially by the process of U.S. Pat. No. 4,011,200
HDT=deflection temperature at 264 psi, ASTM D-648
Impact=Izod impact, ft lbs/in notch, ASTM D-256 A (at room temperature).
Lubricant=Pluronic F88 ethylene oxide/propylene oxide copolymer, obtained from Wyandotte Chemical Co.

EXAMPLES 1-7

Carboxylation of Polyphenylene Ether Resins

Dry blends of powdered PEC resins with varying levels of maleic anhydride were prepared by mixing the components thoroughly for five minutes in a Henschel blender. The dry blends were then fed to a 1¾" single screw compounding extruder, using a screw speed of 50 rpm and barrel and die temperatures in the range of 600°-620° F. and stock temperatures in the range 600°-625° F., to melt process the mixture. Aliquot samples of the resin, after being dissolved in chloroform, reprecipitated with isopropanol and dried, were analyzed by FTIR to demonstrate the presence of bound maleic anhydride. Analyses by L/C methods were used to determine the level of free maleic anhydride in the carboxylated resins. The carboxylated polyphenylene ether compositions of Example 1-7 are summarized in Table I, together with Control Example A, a PEC resin subjected to the same compounding process steps in the absence of maleic anhydride.

TABLE I

| | Ex. No. | | | | | | | |
|---|---|---|---|---|---|---|---|---|
| | 1 | 2 | 3 | 4 | 5 | 6 | 7 | A |
| PEC (pbw) | 100 | 100 | 100 | 100 | 100 | 100 | 100 | 100 |
| Maleic Anhyd charged (pbw) | 0.10 | 0.25 | 0.50 | 0.75 | 1.00 | 2.00 | 3.00 | 0 |
| Free Maleic, ppm | * | * | 10 | 40 | — | 665 | 1320 | 0 |

Notes:
Free maleic = unattached maleic anhydride present in extrudate
*below detection limits.

It will be apparent that the carboxylation of PEC using low levels of maleic anhydride is surprisingly effective in the absence of a free radical generator. However, with increasing levels of maleic anhydride (charged), the amount of free maleic anhydride is seen to increase substantially. At levels of 2 pbw and above, the amount of free maleic anhydride in the resulting resin becomes substantial.

EXAMPLES 8-14

Alloys of polyamide and Carboxylated Polyphenylene Ether Resins

The carboxylated PEC resins of Examples 1-7 were melt blended with an equal weight of nylon 6,6 by melt-mixing a dry blend of pelletized resins in a 1¾" compounding extruder. The extrudate was chopped and injection molded on a 3 oz Van Dorn screw injection molding machine to provide test specimens. The compositions and physical properties of the alloys are summarized in Table II.

TABLE II

| | Ex. No. | | | | | | | |
|---|---|---|---|---|---|---|---|---|
| | 8 | 9 | 10 | 11 | 12 | 13 | 14 | B |
| Carboxy. PEC: | | | | | | | | |
| Ex. No. | 1 | 2 | 3 | 4 | 5 | 6 | 7 | A |
| pbw | 50 | 50 | 50 | 50 | 50 | 50 | 50 | 50 |
| Nylon 6,6 | 50 | 50 | 50 | 50 | 50 | 50 | 50 | 50 |
| Impact | 0.60 | 0.80 | 0.80 | 0.80 | 0.80 | 0.80 | 0.50 | 0.20 |
| Insol, pbw | 6.98 | 9.09 | 7.22 | 16.12 | 18.10 | — | 22.73 | 6.40 |

The insoluble component of each composition was determined by extracting a pelletized sample first with 90% formic acid, then with hot (100° C.) toluene, to remove both the polar and non-polar soluble resin components. The insoluble residue remaining, apparently a cross-linked composition containing nylon 6,6 and PEC, was not further melt processable and could not be melt-pressed into films.

The level of insolubles is quite low at levels of maleic anhydride (charged) below about 0.75 (Examples 8-10), and increases sharply at and above that level. The impact properties of the alloys reaches a maximum at a level of only 0.25 pbw maleic anhydride, and is decreased significantly at the highest (3.0 pbw) level. It is thus apparent that the level of maleic anhydride needed to impart useful properties to the alloy is very low, with as little as 0.1 pbw providing significant improvement in impact.

EXAMPLES 15-21

Impact-Modified Alloys of Nylon 6,6 and Carboxylated PEC Resins

The carboxylated PEC resins of Examples 1-7 were compounded with Nylon 6,6 and a hydrogenated styrene-butdienestyrene impact modifier, obtained as Kraton G 1651 from Shell Oil Company. The dry blends were prepared, melt mixed, and molded substantially by the procedures for Examples 7-14.

The compositions and the physical properties of injection molded samples are summarized in Table III.

TABLE III

| | Ex. No. | | | | | | | |
|---|---|---|---|---|---|---|---|---|
| | 15 | 16 | 17 | 18 | 19 | 20 | 21 | C |
| Carboxy. PEC: | | | | | | | | |
| Ex. No | 1 | 2 | 3 | 4 | 5 | 6 | 7 | A |
| pbw | 50 | 50 | 50 | 50 | 50 | 50 | 50 | 50 |
| Nylon 6,6 pbw | 50 | 50 | 50 | 50 | 50 | 50 | 50 | 50 |
| Kraton G | 5 | 5 | 5 | 5 | 5 | 5 | 5 | 5 |
| Impact | 0.90 | 2.80 | 3.00 | 2.70 | 2.80 | 2.60 | 2.30 | 0.5 |
| Yield (psi) | 9070 | 9225 | 9290 | 9300 | 9265 | 9210 | 9367 | 8743 |
| Tens. Mod. (Kpsi) | 335 | 366 | 363 | 361 | 361 | 359 | 369 | 342 |
| E (%)* | 32 | 142 | 102 | 59 | 52 | 124 | 154 | 5 |
| COLOR | | | | | | | | |
| Delta E | 1.64 | 4.02 | 6.74 | 9.19 | 13.64 | 20.47 | 23.96 | 0 |

Notes:
*Single-point determinations.
Yield = tensile yield,
Tens. Mod. = tensile modulus,
E = tensile elongation.
Color shifts determined by Macbeth 1500 color analyzer, reported as delta E values compared with control C.

The compositions of Examples 15-17, again demonstrate that significant property improvements are realized even with levels of maleic anhydride charged as low as 0.1, and little further improvement is seen for levels above 0.50. With further increases in maleic anhydride above about 0.75, some decrease in most properties will be noted. At levels of maleic anhydride above about 0.75 and particularly above about 1.0, the color of the resulting blends will be seen to deteriorate substantially, as reflected by the color data summarized in Table III.

EXAMPLES 22-31

Further impact-modified blends were prepared on the 28 mm twin screw extruder and molded substantially as in Examples 15-21, but using a variety of polyamides and carboxylated PEC/polyamide ratios. The compositions and physical properties are summarized in Table IV.

TABLE IV

| | Ex. No. | | | | | | | | | |
|---|---|---|---|---|---|---|---|---|---|---|
| | 22 | 23 | 24 | 25 | 26 | 27 | 28 | 29 | 30 | 31 |
| Carboxy PEC pbw | 47.5 | 47.5 | 47.5 | 9.5 | 19 | 28.5 | 45 | 55 | 65 | 75 |
| Nylon 6,6 pbw | | | | 85.5 | 76 | 66.5 | 50 | 40 | 30 | 20 |
| Nylon 6 pbw | 47.5 | | | | | | | | | |
| Nylon 12 pbw | | 47.5 | | | | | | | | |
| Amorph. Nylon pbw | | | 47.5 | | | | | | | |
| Kraton G pbw | 5.0 | 5.0 | 5.0 | 5.0 | 5.0 | 5.0 | 5.0 | 5.0 | 5.0 | 5.0 |
| Impact | 3.1 | 0.8 | 2.9 | 1.8 | 2.0 | 2.6 | 3.5 | 3.1 | 0.3 | * |

Notes:
Carboxy PEC = contains 0.5 phr maleic anhydride, Example 3;
Nylon 6 = Capron 8209 F from Allied Chemical Company;
Nylon 12 = Grilamid TR-55 from Emser Industries.
Amorph. Nylon = Zytel 330 Dupont Co.
*Incompatible.

The process of this invention is thus useful in preparing blends with a variety of polyamides, including those sold as amorphous nylons. Compatible compositions result from carboxylated PPE/Polyamide ratios over the range 10:90 (Example 25) to about 70/30 (Example 30). At levels of polyamide below about 25 wt % (75/25 ratio), the blends appear to become less compatible (Example 31).

COMPARATIVE EXAMPLES D-G

In the following Comparative Examples, carboxylation of PEC resin with maleic anhydride was carried out substantially by the processes of Example 1-7, but including dicumyl peroxide as a free-radical generator. The resulting compositions were then melt-blended with Nylon 6,6 as in Examples 8-15, and molded to provide specimens for testing. The compositions and their physical properties are summarized in Table V. Example 32, a composition according to the practice of this invention, is provided by way of comparison.

TABLE V

| | Ex. No. | | | | |
|---|---|---|---|---|---|
| | D | E | F | G | 32 |
| Carboxylation | | | | | |
| PPE (pbw) | 100 | 100 | 100 | 100 | 100 |
| Maleic Anh. charged (pbw) | 0.5 | 0.5 | 0.5 | 0.5 | 0.5 |
| DiCUP (pbw) | 0.1 | 0.5 | 1.0 | 0.0 | 0.0 |
| Blends | | | | | |
| Carbox PPE (pbw) | 47.5 | 47.5 | (a) | 47.5 | 47.5 |
| Nylon 6,6 (pbw) | 47.5 | 47.5 | — | 47.5 | 47.5 |
| Kraton G (pbw) | 5.0 | 5.0 | — | 5.0 | 5.0 |
| DiCup (pbw) | — | — | — | 0.5 | — |
| Impact | 2.3 | 2.4 | — | 1.5 | 2.9 |

Notes:
(a)Composition F cross-linked in the extruded during carboxylation. No blend with Nylon 6,6 was attempted.

It will be apparent from these data that the use of a free-radical generator either in the carboxylation step as in Comparative Examples D-F, or during the blending with the polyamide as in Comparative Example G, has a detrimental affect on impact properties, with severe degradation at the higher levels of peroxide.

COMPARATIVE EXAMPLES H–I

An alternative method for preparing blends of polyamides and phenylene ether resins by melt-mixing a mixture of the polyamide, the phenylene ether resin and maleic anhydride, as taught by U.S. Pat. No. 4,315,086 was evaluated. The components were dry-blended, then melt-mixed by feeding the mixture to either a 1¾" single screw extruder (Control Example H) or a 28-mm co-rotating twin screw extruder (Control Example I), in order to accomplish an extended residence time. The blends were extruded, pelletized and injection-molded to provide test specimens. The formulations and properties are summarized in Table V. Example 33, a composition according to the teachings of this invention was prepared for comparision purposes, by first melt-mixing the PEC and maleic anhydride, then adding the nylon component as in Examples 1–15.

TABLE VI

| | Ex. No. | | | |
|---|---|---|---|---|
| | H | I | 33 | 12 |
| Components | | | | |
| PPE (pbw) | 50 | 50 | 50 | 50 |
| Maleic Anhyd (pbw) | 1.0 | 1.0 | 0.5 | 1.0 |
| Nylon 6,6 (pbw) | 50 | 50 | 50 | 50 |
| F-88 (pbw) | 0.5 | 0.5 | 0.5 | — |
| Impact | 0.25 | 0.4 | 0.72 | 0.80 |
| Compatible | delamin brittle | smooth ductile | smooth ductile | smooth ductile |

It will be apparent from consideration of these examples that melt-mixing a mixture of the polyamide, phenylene ether resin and maleic anhydride in a single step, whether using brief residence times (Control Example H) or extended and more intense mixing, (Control Example I) provides blends that are distinctly inferior in impact, when compared with the products prepared by the improved process of this invention (Examples 12 and 33).

COMPARATIVE EXAMPLE J

A further comparative example was carried out by melt-mixing a mixture of 12.5 pbw polyamide (Nylon 6,6), 50 pbw PEC, 0.625 pbw maleic anhydride and 0.3125 pbw lubricant in a 28 mm co-rotating twin screw extruder. The resulting blend was then further compounded on the twin screw extruder with 37.5 pbw Nylon 6,6 and 5 pbw Kraton G impact modifier. The extrudate was pelletized and injection molded to provide test specimens having an Izod impact value of 1.9 ft. lbs/in. notch. An equivalent composition prepared by the process of this invention from 50 pbw carboxylated PPE (1.0 pbw maleic anhydride), 50 pbw Nylon 6,6 and 5 pbw Kraton G had an Izod impact value of 3.5 ft. lbs/in. notch.

The process of this invention thus also provides impact modified alloys having substantially better properties than those produced inthe prior art processes.

COMPARATIVE EXAMPLE K

A further comparative example was carried out by first melt compounding 100 pbw Nylon 6,6 with 1.0 pbw maleic anhydride in a 28-mm twin screw extruder, then adding 100 pbw PEC resin, pelletizing the resulting blend and injection molding the pellets to provide test specimens. The resulting blend had a notched Izod impact at room temperature of 0.24 ft lbs/in notch, again inferior to the blends prepared by the improved process of this invention (c.f. Table II, Example 12, having an impact of 0.80 ft. lbs/in notch).

It will be apparent that blends prepared according to the teachings of the invention exhibit substantially improved properties over those prepared by prior art processes such as those of U.S. Pat. No. 4,315,086, or by the similar processes of Japanese published applications Nos. 59/66452 and 59/59724 which employ a free-radical iniator in the carboxylation step.

COMPARATIVE EXAMPLES L–N

A quantity of the carboxylated PEC resin of Example 3 was dissolved in chloroform, then reprecipitated in methanol to ensure the substantial absence of all low molecular weight components, including minor amounts of unreacted maleic anhydride. The carboxylated resin, after drying, was compounded with Nylon 6,6, Kraton G and varying amounts of maleic anhydride, using a 28 mm twin screw compounding extruder. The resulting blends were injection molded as before and tested. The composition and properties are summarized in Table VII.

TABLE VII

| | Ex. No. | | |
|---|---|---|---|
| | L | M | N |
| Rept. Carboxy PPE pbw | 47.5 | 47.5 | 47.5 |
| Nylon 6,6 pbw | 47.5 | 47.5 | 47.5 |
| Kraton G, pbw | 5.0 | 5.0 | 5.0 |
| Maleic Anhy, pbw | 0 | 0.5 | 1.0 |
| Impact | 3.9 | 3.2 | 2.2 |
| Color | | | |
| Delta E | 0 | 3.0 | 7.77 |

Color shifts, delta E, compared with control L; see notes to TABLE III.

It will again be apparent that the presence of maleic anhydride in blends of PEC and polyamides during the melt processing step has a deleterious effect on properties and on color, even though the PEC resin is first carboxylated according to the teachings of this invention.

EXAMPLE 34

A homopolymer of 2,6-dimethylphenol, H-PPE, prepared by the polymerization process described in U.S. Pat. No. 4,011,200, was carboxylated according to the procedure use in Examples 1–7, using 100 pbw H-PPE and 0.5 pbw maleic anhydride. The carboxylated H-PPE (47.5 pbw) was then melt-blended with 47.5 pbw Nylon 6,6 and 5.0 pbw Kraton G impact modifier, using the procedures of Examples 15–21. The extrudate was smooth and ductile, and injection molded specimens had an Izod impact value of 2.5 ft. lbs/in. notch.

EXAMPLE 35

PEC resin (100 pbw) and 1.0 pbw of itaconic acid were dry blended and melt-compounded in a 1¾" single screw extruder. The resulting carboxylated PEC resin (50 pbw) was then melt-blended with 50 pbw Nylon 6,6 in a compounding extruder, providing a smooth, ductile extrudate. The extrudate, on injection molding, gave test specimens having a 0.50 ft lbs/in notch Izod Impact value.

CONTROL EXAMPLE O

The proceedure of Example 35 was repeated using 1.0 pbw succinic anhydride in place of the itaconic acid. The blend of carboxylated PEC resin with Nylon 6,6 gave only a poorly compatibilized mixture when compounded on a single screw extruder, which had poor integrety. The blend was not be molded. Compounding in a 28 mm twin screw extruder afforded only slight improvement, giving test specimens having a 0.21 ft lbs/in notch. The procedure was repeated, using 1.0 pbw succinic anhydride and 0.5 pbw dicumyl peroxide per 100 pbw PEC. The blend of this material with Nylon 6,6 gave very rough, brittle extrudate when compounded on the twin screw extruder.

It will therefore be apparent that only ethylenically-unsaturated carboxylic compounds are effective in the carboxylation of PPE resins. The saturated analogs such as succinic anhydride are ineffective, even when employed together with a free-radical generator such as a peroxide compound.

The polyamide-carboxylated phenylene ether resin compositions of this invention are useful as thermoplastic in a variety of engineering applications. They may also be further blended with additional phenylene ether resin that has not been carboxylated without deterimental effects on properties.

EXAMPLE 36

PEC resin, 20 pbw, was blended with 30 pbw of the carboxylated phenylene ether resin of Example 5, 50 pbw Nylon 6,6 and 5 pbw Kraton G. The injection molded product had an Izod impact value of 3.0 ft lbs/in notch, quite comparable with the impact properties of Example 19, prepared using only the carboxylated PPE resin of Example 5.

This invention will thus be seen to be an improved process for preparing alloys and blends of polyamides with phenylene ether resins, wherein the phenylene ether resin is first carboxylated by melt-mixing a mixture consisting essentially of 100 parts by weight of a phenylene ether resin and from 0.05 to about 2.0, preferably 0.1 to about 1.0, parts by weight of an ethylenically unsaturated carboxylic acid compound, then melt-blended with a polyamide, as well as improved polyamide phenylene ether resin compositions prepared by the process of this invention.

We claim:

1. A composition comprising from 25 to 95 wt % of a polyamide and, correspondingly, from 75 to 5 wt % of a carboxylated phenylene ether resin, said carboxylated resin being the product of melt-mixing a mixture consisting essentially of 100 parts by weight phenylene ether resin and from 0.05 to 1.0 pbw of an ethylenically unsaturated carboxylic acid compound.

2. The composition of claim 1 where the ethylenically unsaturated carboxylated compound is selected from the group consisting of carboxylic anhydrides and carboxylic acids.

3. The composition of claim 1 wherein said carboxylic compound is maleic anhydride.

4. The composition of claim 1 wherein said carboxylic compound is itaconic acid.

5. An improved process for preparing blends of polyamides and phenylene ether resins comprising the steps of
    a. melt-mixing a mixture consisting essentially of 100 parts by weight of phenylene ether resin and from 0.05 to 1.0 pbw of an ethylenically unsaturated carboxylic compound to provide a carboxylated phenylene ether resin; and
    b. further melt processing said carboxylated phenylene ether resin in the presence of polyamide.

6. The process of claim 5 wherein the weight ratio of said carboxylated polyphenylene ether resin to said polyamide lies in the range of 95/5 to 5/95.

7. The process of claim 5 wherein said ethylenically unsaturated carboxylic compound is selected from the group consisting essentially of carboxylic anhydrides and carboxylic acids.

8. The process of claim 5 wherein said carboxylic compound is maleic anhydride.

* * * * *